United States Patent [19]

Howard et al.

[11] Patent Number: 4,497,552
[45] Date of Patent: Feb. 5, 1985

[54] DATA RECORDING SYSTEM FOR CAMERAS

[76] Inventors: Lowell C. Howard, 2249 King St., Salt Lake City, Utah 84109; Charles K. Peterson, 1483 West 300 South, Salt Lake City, Utah 84104

[21] Appl. No.: 458,159

[22] Filed: Jan. 14, 1983

Related U.S. Application Data

[63] Continuation-in-part of Ser. No. 290,362, Aug. 5, 1981, abandoned, which is a continuation of Ser. No. 87,873, Oct. 24, 1979, abandoned.

[51] Int. Cl.³ .............................................. G03B 17/24
[52] U.S. Cl. .................................................... 354/106
[58] Field of Search .............................. 354/105–109

[56] References Cited

U.S. PATENT DOCUMENTS

| | | | |
|---|---|---|---|
| 3,449,112 | 3/1970 | Heilmeier et al. | 178/7.7 |
| 3,827,070 | 7/1974 | Hoerenz et al. | 354/105 |
| 4,167,315 | 9/1979 | Nanba et al. | 354/106 |
| 4,181,416 | 1/1980 | Ohtaki et al. | 354/106 |
| 4,198,146 | 4/1980 | Taguchi et al. | 354/106 |
| 4,268,143 | 5/1981 | Dearing et al. | 354/106 |
| 4,384,771 | 5/1983 | Sakurada et al. | 354/105 |

FOREIGN PATENT DOCUMENTS

| | | | |
|---|---|---|---|
| 2654259 | 6/1977 | Fed. Rep. of Germany | 354/105 |
| 2710735 | 9/1978 | Fed. Rep. of Germany | 354/106 |
| 44633 | 4/1977 | Japan | 354/106 |
| 612014 | 6/1979 | Switzerland | 354/106 |

OTHER PUBLICATIONS

Appel, A. et al., *Data Recording Apparatus for Camera*, in IBM Tech. Disc. Bul., vol. 2, No. 6, 11-1977.

*Primary Examiner*—John Gonzales
*Attorney, Agent, or Firm*—Mallinckrodt, Mallinckrodt, Russell & Osburn

[57] ABSTRACT

An apparatus and method for placing information on film takes advantage of the chemical memory of the film to use low cost displays and interface circuitry capable of displaying only a limited number of informational characters to place more than those limited number of characters on the film. This is achieved by sequentially exposing at least two separate sets of a limited number of characters on different portions of the film.

16 Claims, 17 Drawing Figures

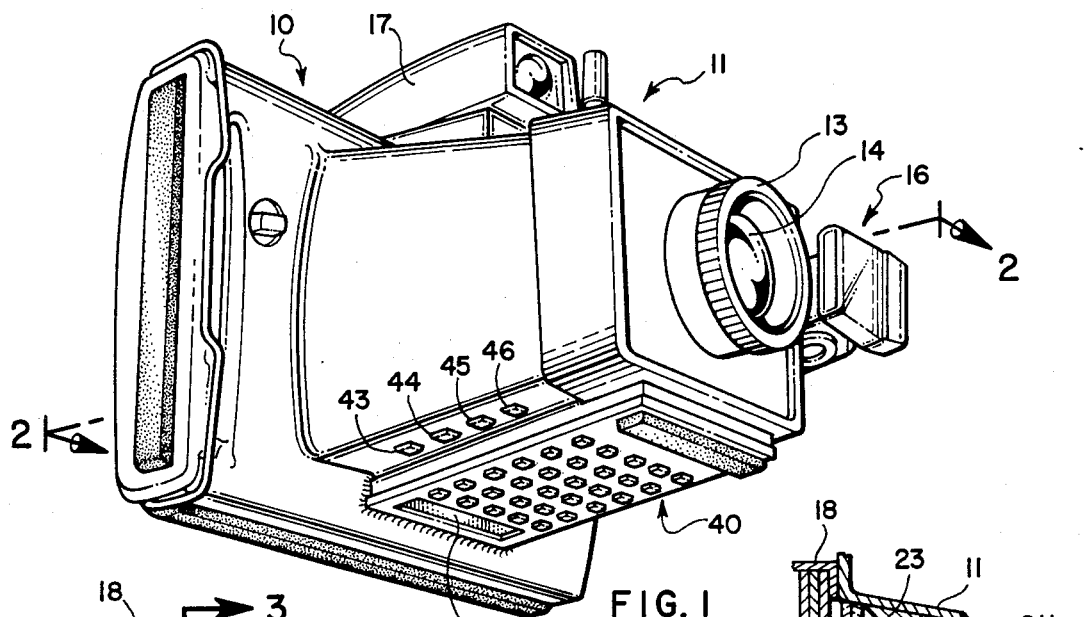
FIG. 1
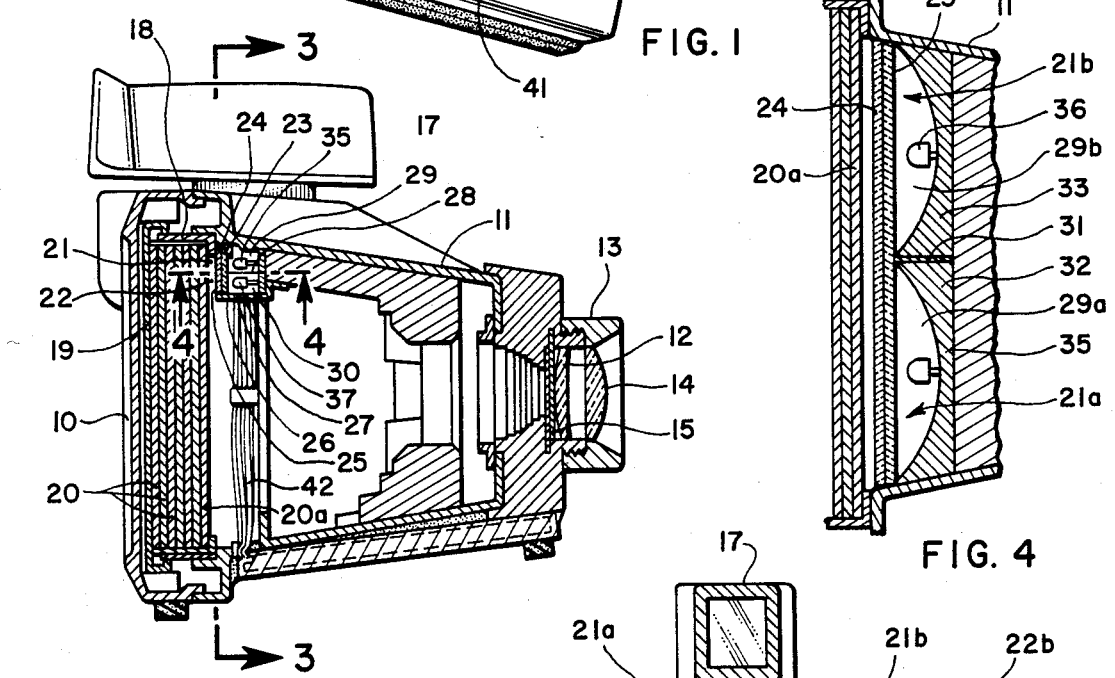
FIG. 2
FIG. 4
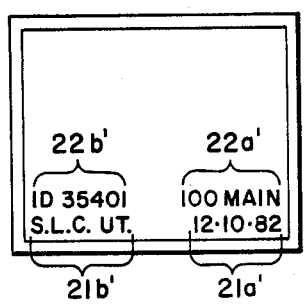
FIG. 6
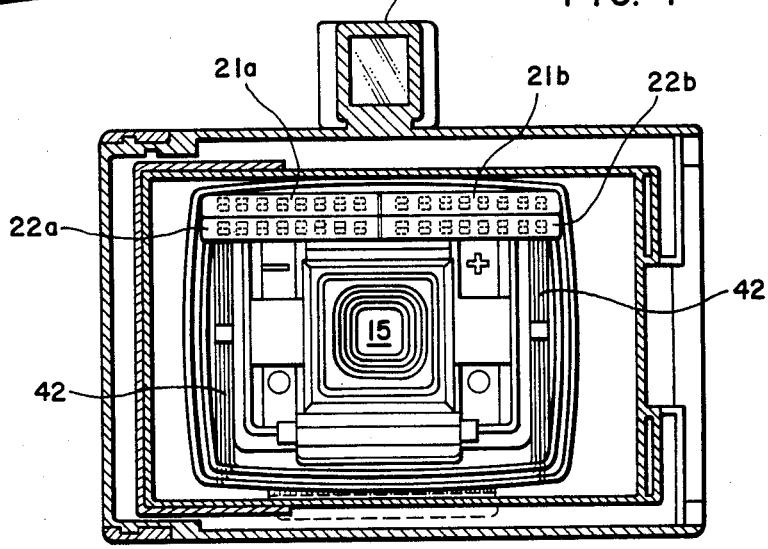
FIG. 3

DATA RECORDING SYSTEM FOR CAMERAS

RELATED APPLICATION

This application is a continuation-in-part of our copending application Ser. No. 290,362 filed Aug. 5, 1981, which was a continuation of our then copending application Ser. No. 087,873 filed Oct. 24, 1979, both abandoned.

BACKGROUND OF THE INVENTION

1. Field

The invention is in the field of devices and methods for putting desired information on film, particularly information regarding a photograph, substantially at the time the film is exposed for the photograph.

2. State of the Art

In many instances, it is desirable to place information about a photograph on the photograph for later reference. The most common way of doing this is to write the desired information on the back or other part of the photograph at the time it is taken if taken with an instant camera, or, if not with an instant camera, at the time the photographs are returned from the developer. If the noting of such information must await the return of the pictures from the developer, the desired information, such as exact date, location, name of subjects, or time of taking, may have been forgotten. Further, many times the information is not recorded on the photographs or becomes illegible and at a later date, when a question arises about it, the information has long been forgotten.

A number of systems for recording data on film have been proposed. U.S. Pat. Nos. 3,478,657 and 3,733,985 show systems utilizing prerecorded information, such as dates, in contrasting data characters on a tape that is moved into position for recording on the film. The characters are generally opaque on a transparent background. These systems are limited in the information that can be recorded since such information has to be available on the prerecorded tapes.

German Pat. No. 2,710,735 shows an alpha-numeric keyboard as an input to an LED display so that a variety of information can be put onto the film. German Pat. No. 2,654,259 and Swiss Pat. No. 612,014 show somewhat similar arrangements.

With all currently proposed systems for putting data on film, the number of characters which can be placed on the film is severely limited. For example, with a system using an LED or LCD display for the characters, the number of characters that can be used is limited by the amount of memory in the driving circuit. While driving circuitry for up to about sixteen characters is readily and inexpensively available, the cost for additional memory to add additional characters increases very rapidly. Thus, providing driving circuitry for larger displays is impractical in a relatively low to moderately priced camera.

In many situations where it is desired to put information on film along with a photograph, such as in law enforcement or insurance adjusting work, to be really useful, more data than current systems can place on film is necessary. It is generally desirable to have more display characters than would be available using a normal sixteen digit display and driving circuitry.

All of the systems currently commercially available to recorad data on film are expensive, lack flexibility of information input, and none have been widely accepted in the marketplace.

SUMMARY OF THE INVENTION

According to the invention, a large number of user selected characters can be recorded on a photograph using only inexpensive, limited memory interface driving circuitry, by using the chemical memory features of the film. Thus, the number of characters to be placed on the film may be substantially increased by sequentially placing a limited number of characters in adjacent positions on the film.

The apparatus of the invention comprises a display capable of displaying at least one set of a limited number of characters, means for the user to enter the limited number of characters making up a set of characters to be displayed, interface means for receiving a set of characters entered, storing such characters entered, and supplying signals to the display indicative of the characters entered, means for defining an information area on the film which can contain more than one set of characters; means for illuminating the display so that one set of characters representing the information stored in the interface means is recorded in a portion of the information area of the film, and means for directing sets of characters illuminated in at least two successively entered and displayed sets of characters onto different positions of the information area of the film.

In one preferred embodiment of the invention, a large display covering the total information area of the film is provided adjacent the film and broken down into multiple units, each having the number of display characters corresponding to the memory provided in the interface circuitry. This number of characters then constitutes a set of characters. The units of the display are illuminated sequentially with sequential input of characters until the desired information is put on the film.

In another preferred embodiment, a single eight or sixteen character display, the number of characters in the display constituting one set of characters, is provided along with means for moving the display to different parts of the defined information area on the film so that successive sets of characters can be entered and displayed sequentially on different parts of the film. The movement may be of the display itself, or may be of lenses, mirrors, or other mechanisms to project the information on different parts of the information area of the film.

THE DRAWINGS

In the accompanying drawings, which illustrate the best mode currently contemplated of carrying out the invention:

FIG. 1 is a perspective view of a camera, illustrated as a Polaroid Minute Maker, showing the keyboard of the invention thereon;

FIG. 2, a vertical section taken on the line 2—2 of FIG. 1;

FIG. 3, a vertical section taken on the line 3—3 of FIG. 2 and showing the display divided into four sections;

FIG. 4 a fragmentary horizontal section taken on the line 4—4 of FIG. 2, drawn to a larger scale, and showing one level of the illumination chamber for the display divided into two sections;

FIG. 5, a circuit diagram showing schematically the four individual display sections of FIG. 3 and four individual light sources for separately lighting each of the display section;

FIG. 6, a schematic representation of a photograph showing information placed thereon;

FIG. 7, a fragmentary vertical section of the portion of the camera of FIG. 2 in which the display is installed, drawn to a larger scale, but showing a second embodiment of the display;

FIG. 8, a fragmentary horizontal section taken on the line 8—8 of FIG. 7 showing a single illumination chamber for the display of FIG. 7;

FIG. 9, a circuit diagram showing schematically the individual display sections of FIGS. 7 and 8 and a light souce common to all display sections;

FIG. 10, a fragmentary vertical section similar to that of FIG. 7, but showing a third embodiment of the display in which the display is movable between two positions, this figure showing the display in down position;

FIG. 11, a fragmentary vertical section similar to that of FIG. 10, but showing the display in up position;

FIG. 12, a fragmentary vertical section taken on the line 12—12 of FIG. 10;

FIG. 13, a fragmentary horizontal section taken on the line 13—13 of FIG. 12 and drawn to a larger scale;

FIG. 14, a fragmentary vertical section similar to that of FIG. 7, but showing a fourth embodiment of the invention in which a lens is positioned adjacent the display for focusing the information displayed on different parts of the film, this figure showing the lens and display positioned to project the display on one portion of the information area of the film;

FIG. 15, a fragmentary vertical section similar to that of FIG. 13, but showing the lens and display positioned to project the display on a different portion of the information area of the film;

FIG. 16, a fragmentary vertical section taken on the line 16—16 of FIG. 14; and

FIG. 17, a fragmentary vertical section similar to that of FIG. 7, but showing a fifth embodiment of the invention in which a display and adjacent lens is positioned to focus the information displayed onto a mirror which is movable to redirect the information onto different portions of the information area of the film.

DETAILED DESCRIPTION OF THE ILLUSTRATED EMBODIMENT

Figure 5:
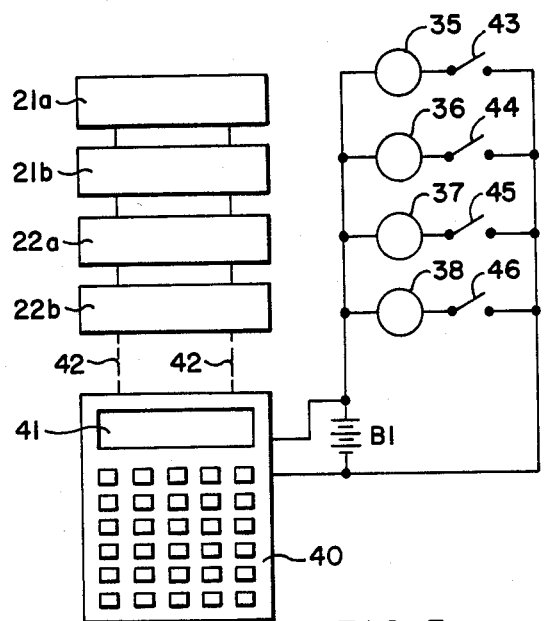

The illustrated embodiments of the invention show and are described with respect to a Polaroid Minute Maker Colorpack Land Camera. It should be understood, however, that the invention can be similarly applied to any type of camera.

The camera illustrated for all embodiments has a body portion 10 with a forward body extension 11 in which lens 12 and focusing ring 13 with lens 14 is mounted. Behind lens 12 is a shutter assembly 15. Flash cube holder and flash lens assembly 16 is attached to the forward end of extension 11, and viewfinder 17 is mounted on top of body 10.

The normal Polaroid film pack with frame 18, backing 19, and film 20, fits into the body of the camera as shown in FIG. 2 with film 20a in the opening ready to be exposed.

Positioned adjacent the top portion of the film 20a are displays 21 and 22, each shown as normal liquid crystal displays with protective plate portions 23 and 24 enclosing the crystal of display 21 and protective plate portions 25 and 26 enclosing the crystal of display 22. Housing walls 27 and 28 form separate closed chambers 29 and 30 on the side of the displays away from the film. Each display 21 and 22 is divided into two separate sections 21a and 21b and 22a and 22b, respectively, FIGS. 3 and 4. A divider 31 extends through each of chambers 29 and 30 to divide each chamber into two chambers as shown by 29a and 29b in FIg. 4. Although chamber 30 is not shown, it is divided into two sections similarly to illustrated chambers 29a and 29b. Thus, in the embodiment illustrated, four separate display sections and four separate associated illumination chambers are provided. As shown, the walls 32 and 33, FIG. 4, of the light chambers away from the display may be configured to substantially evenly distribute the light over the area of the display. In this way, the information will be evenly exposed on the film.

Separate Light Sources 35, 36, 37, and 38 are provided in each of the chambers to individually illuminate the respective sections 21a, 21b, 22a, and 22b, of the respective liquid crystal displays from the side opposite the film.

The light sources 35, 36, 37, and 38 are preferably light emitting diodes, or several light emitting diodes arranged with respect to the sections of the liquid crystal displays so as to evenly light them. Any color light emitting diode may be used, but either yellow or green is preferred because red does not show up on black and white film. Light emitting diodes are preferred because of their low power requirements, but other light sources such as small incandescent lamps could be used. The light sources may be powered by a separate power supply such as a separate battery or may be powered by any of the batteries used by the camera.

It is preferred that a separate battery be used to supply power to the data recording system, which includes the keyboard, interface means, displays, and display light sources, so that the data recording system does not interfere with any camera function.

With the specific arrangement illustrated, the displays should be located adjacent the film to be exposed so that good resolution of the data shown on the displays is obtained on the film and so that the light from the displays does not reach and expose film other than that directly adjacent the displays. It is preferable to have the displays as close to the film to be exposed as possible, although a small space such as that shown between the film and displays is not usually harmful.

The displays may be operated by any standard alpha numeric keyboard 40 such as the one used on a Radio Shack ED-4002 Alpha-Numeric Calculator-Directory. The keyboard is electrically connected to electronic circuitry, which is not separately shown but which is preferably located in the case with the keyboard and forms an interface means between the keyboard and the display. The interface means receives the information as it is entered on the keyboard, stores the information as it is entered, and supplies such information to the display. Such interface means are well known and, for example, may comprise all of the circuitry and components as included in the afore-mentioned Calculator-Directory. It is preferred that a liquid crystal display 41, such as is standard with such Calculator-Directory unit, be provided on the outside of the camera, and that smaller liquid crystal display units be located within the camera. The smaller the displays located in the camera, the less picture space on the film is used for recording any given amount of data. Each display section in the camera is connected in electrical parallel to the Calculator-Directory unit by wires 42. In this way, the information as entered into the keyboard is displayed on the Calculator-Directory unit display 41 as well as on the display sections 21a, 21b, 22a, and 22b in the camera, thereby allowing the user to see exactly what will appear on the photograph. In the preferred embodiment of the invention, all functions of the interface means will probably be incorporated into a custom-built, integrated circuit chip that will be used with a custom-labeled keyboard and with the desired liquid crystal or light-emitting diode displays.

The Calculator-Directory unit identified above has an eight-character display and has the memory capability to store eight characters entered by the keyboard and to cause display of these eight characters. Interface circuitry to accept and store up to sixteen characters entered by a keyboard and to cause display of these sixteen characters is also readily and inexpensively available in off-the-shelf units, as circuitry to be incorporated into custom-built integrated circuit chips, or as integrated circuit chips that can be readily combined with other circuitry for special purposes.

As indicated above, and as shown schematically in FIG. 5, each section of the display is connected in electrical parallel to the interface means so that characters entered on the keyboard are displayed simultaneously by all sections of the display in the camera, as well as on display 41 outside the camera and visible to the user. Light sources 35, 36, 37 and 38 are electrically connected in parallel to one terminal of battery B1 which is also connected to the interface means to supply power to the interface circuitry and the displays. Such battery B1 may be the normal battery as held in the case of the above identified Calculator-Directory unit. Light source 35 is conncted to the other terminal of battery B1 through normally open switch 43, while light sources 36, 37, and 38 are similarly connected through normally open switches 44, 45, and 46, respectively.

In order to record the desired data on the film 20a, the first eight characters of the information are entered into the interface means by the user through the keyboard 40 and the characters appear on each of the displays 21a, 21b, 22a, 22b, and 41. The user can check the characters entered on display 41 and make any necessary conditions in normal manner. The user then momentarily closes switch 46 which causes illumination of light source 38 and the information as displayed in display 22b is exposed onto the film that is immediately adjacent that section of the display, i.e. area 22b', FIG. 6. The user than enters the second eight characters of information via the keyboard into the interface means which is again displayed on all sections of the display. This time the user closes switch 45 which causes illumination of light source 37 and the information in display section 22a is recorded on the film adjacent that section, i.e at area 22a'. The procedure is repeated until all the information desired is placed on the film, or until all of the display sections have been illuminated and the maximum characters available placed on the information area of the film, i.e. the area of the film adjacent the four display sections. The displays 21 and 22 must be located at the top of the exposure, as shown, in order to appear at the bottom of the picture, and must be upside down and read right to left if looking from the film. This is because the image of the subject being photographed through the lens is reversed and upside down on the film, while the image of the information is as it appears on the display. Thus, with the display upside down and reversed, the information on the picture will have the same format and be correct when looking at the picture. With back lighted liquid crystal displays as shown, the display may be adapted to make the characters substantially opaque to light passage and the background substantially transparent to light passage so that light will pass about the characters to produce dark characters on a light background. Alternately, and preferably, the display can be adapted to produce substantially transparent charactaers or a substantially opaque background to produce light characters on a dark background.

The switches 43, 44, 45, and 46 will preferably be incorporated into a custom keyboard to take the place of keyboard 40, or, where an off-the-shelf standard keyboard 40 is used, may be located at any convenient position on the camera, such as adjacent the keyboard 40 as shown in FIG. 1. Rather than four separate switches as illustrated, a single switch with a sequencing circuit could be used so that when the switch is initially closed, the first display section is illuminated, when closed the second time, the second section is illuminated, when closed the third time, the third section is illuminated, and when closed the fourth time, the fourth section is illuminated. Further, circuitry could be provided to perform the illuminating function automatically, such as automatically illuminating each section as it is filled with informtion.

Depending upon the light source used and upon the sensitivity of the film, it may be desirable to use a timing circuit in connection with illuminating the light source. With such a circuit, the construction of which would be obvious to one skilled in the electronics art so is not detailed here, the exposure of the displayed information onto the film would be controlled by insuring that the exposure time was the same each time the light source was illuminated. Thus, if the light source was illuminated by a switch as described, the timing circuit would keep the time during which the source is illuminated the same regardless of the length of time the switch was depressed.

Also, it will be understood that although four sections of eight characters each have been shown, any number of display sections could be provided and each section could have any number of characters. As indicated above, somewhere between eight and sixteen characters per section is presently preferred because memory circuitry is readily available to drive such display sections, but as larger memory and driving circuitry for displays become available at reasonable prices, larger sections could be used. The number of sections used will depend upon the number of characters to be provided. Thus, four eight-character display sections will allow up to thirty-two characters of information to be placed on the film. Six eight-character display sections will allow up to forty-eight characters. The number of display sections will depend upon the size of the display sections and how large the information area of the film can be as compared to the picture portion.

Figure 9:
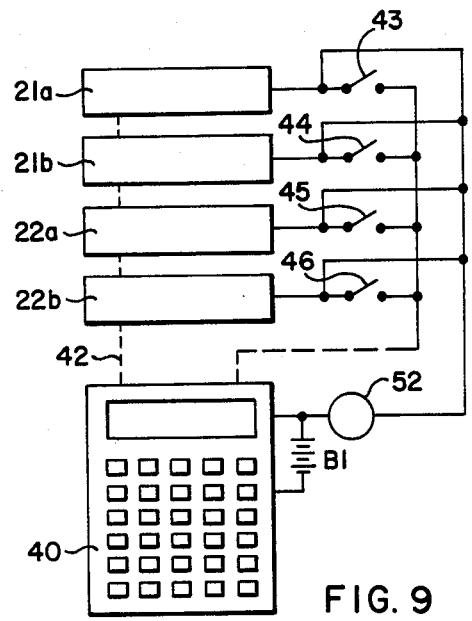
Figure 7:
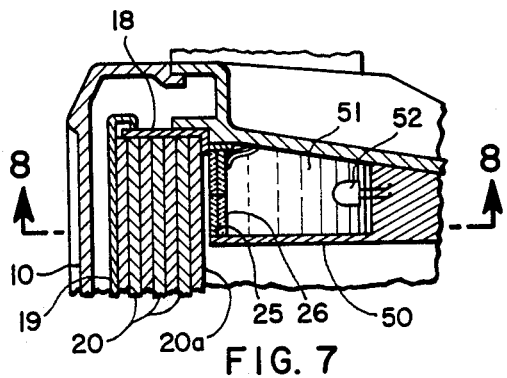
Figure 8:
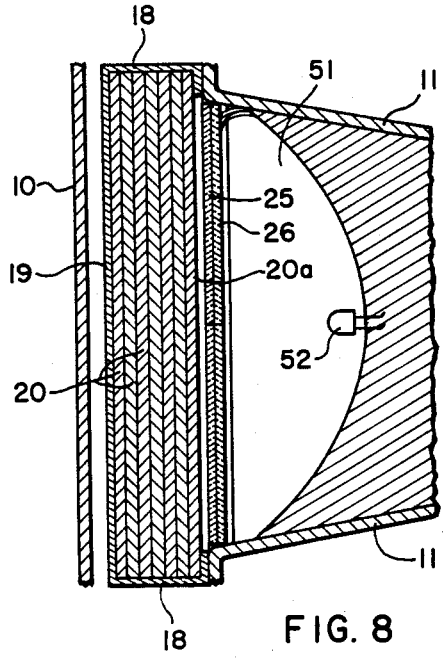

A second embodiment of the invention is shown in FIGS. 7, 8, and 9. FIGS. 7 and 8 show a camera and four separate liquid crystal sections arranged similarly to those shown in FIGS. 2, 3, and 4. In this embodiment, however, there are no separate chambers with separate light sources for each display section. Wall 50 at the bottom of the displays forms a single chamber 51 on the side of the displays away from the film and a single light source 52 is provided in the chamber. In this embodiment, the liquid crystal displays are adapted to be normally substantially opaque to light, with the characters displayed becoming transparent to light. This is easily accomplished by merely reversing one of the two polarizers used with the normal liquid crystal display.

It should be noted that wires 42 as shown in various figures include the many information signal conductors necessary to operate the display and a return ground line. The ground line is necessary to complete the circuit through each display segment and must be connected for a segment to operate. Generally, the ground line is connected in electrical parallel with all segments of a display. Thus, in FIGS. 5 and 9, the wires 42 shown represent many individual wires. The single wire on the right has conveniently been used to represent the common ground wire. As shown by FIG. 9, the switches 43, 44, 45, and 46 are connected in the return ground line of the respective displays so that when characters are entered via the keyboard into the interface circuitry, the information is supplied to each display, but is not actually displayed since there is an open circuit (open ground line) between each display in the camera and the interface means. The characters would be displayed on exterior display 41 so the user can see the information that has been entered. When the desired information has been entered, the appropriate switch 43, 44, 45, or 46 is closed. This causes the entered characters to be displayed on the chosen display and also closes the circuit for light source 52 which illuminates all displays. For example, if the desired information is entered and switch 43 closed, the display 21a would display the entered information as transparent characters with an opaque background, and light source 52 would be illuminated and expose those characters on the film in position 21a' of FIG. 6. Since the other displays would not be activated, they would remain substantially opaque to light and the film adjacent to them would not be exposed.

If a light-emitting diode display is used, the circuitry of FIG. 9 could be employed without light source 52. In such instance, the display is its own light source and by closing one of the switches 43-46, the associated display would become illuminated and the displayed information exposed onto the film.

While the two embodiments of the invention described above utilize a large display with multiple sections that are illuminated sequentially, it will be understood that this is only one way of accomplishing the sequential exposure of displayed information onto the film. A single display may be used which is itself movable to different portions of the information areas of the film, or which is stationary, but with lenses or mirrors or a combination of lenses or mirrors used to focus the displayed information on different areas of the film.

FIGS. 10-13 show an embodiment of the invention wherein the display itself is movable in relation to the film to be exposed. As shown, a liquid crystal display 55 is mounted on wall 56 hinged at 57 to back wall 58 secured to upper wall 59 of camera forward body extension 11. A shaft 60 is rotatably held by holes 61 in walls 62, FIGS. 12 and 13, of housing 63 which is secured to wall 59. Gears 64 secured to shaft 60 engage racks 65 on channels 66 which are secured to opposite edges of display 55. Thumb wheel 67 is also secured to shaft 60 and extends through the housing 63 at 68 so that it can be rotated by the user. It will be seen that rotation of the thumb wheel causes rotation of gears 64 which, in turn, cause movement of display 55 up and down in relation to camera wall 59 and film 20a to be exposed. Channels 66 are slidably positioned on guides 69 so that display 55 remains in position adjacent film 20a as it moves.

A light source 70, such as a light emitting diode, or incandescent lamp, is positioned on holder 71 in chamber 72 formed by walls 56, 58, and 59. Wires 73 extend from terminal strip 74 to light source 70 while wires 75 extend to display 55.

Figure 10:
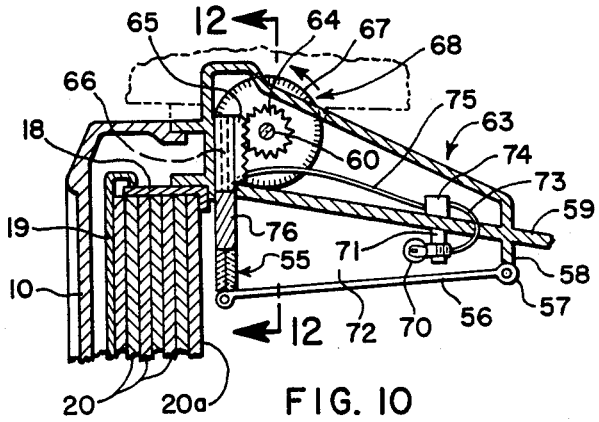

A wall 76, opaque to passage of light, is positioned between channels 66 immediately above display 55. Thus, with the display 55 in its down position as shown in FIG. 10, and the desired characters displayed thereon, when light source 70 is illuminated, the characters will be exposed onto the film adjacent the display. Wall 76 prevents exposure of the film above display 55. Light source 73 may be illuminated by means of a switch, not shown, connected in normal manner similarly to switch 43 in FIG. 5.

Figure 11:
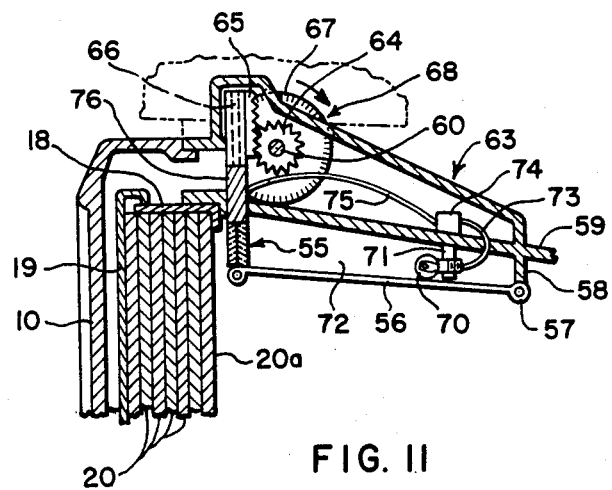
Figure 12:
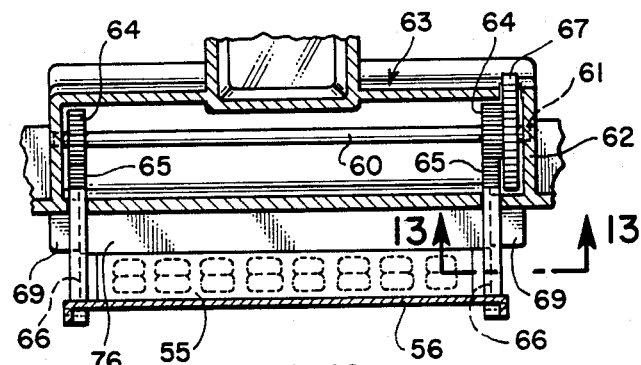
Figure 13:
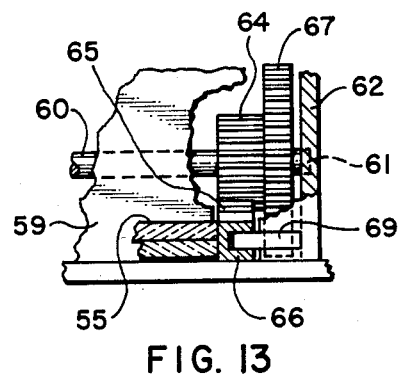

After illumination of light source 70 with display 55 in its down position as shown in FIG. 10, thumb wheel 67 is rotated to move display 55 into its up position shown in FIG. 11. The data for the second line of information is entered by the user and displayed on display 55. Light source 70 is then illuminated and the information on the display exposed onto the film.

While two positions for display 55 are shown and described, more than two positions could easily be used. Also, various types of positioning means could be used.

Since it is preferred to have display 55 cover the length (side to side) of the information area so that mechanical movement then moves the display through the two or more positions over the width of the area (up and down), it is preferable that display 55 contain sixteen characters of information and that appropriate interface means with memory for sixteen characters be used. However, as shown, eight characters could be used or the display could be broken down into sections which would operate as described above for the multi-section displays in addition to being mechanically moved. In addition, the display could be arranged to be mechanically moved over the length of the information area as well as the width.

Figure 14:
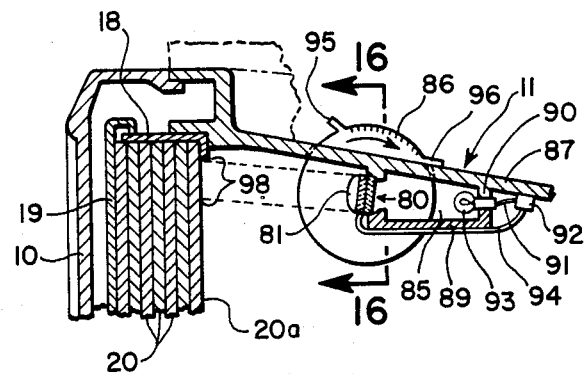
Figure 16:
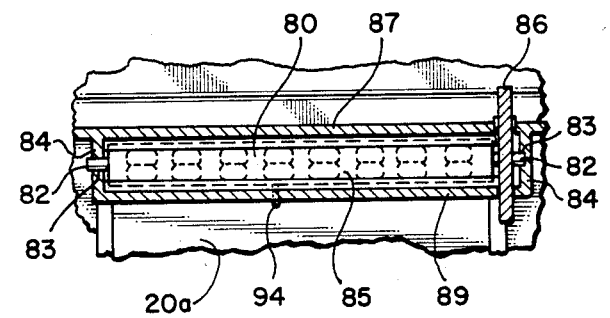
Figure 15:
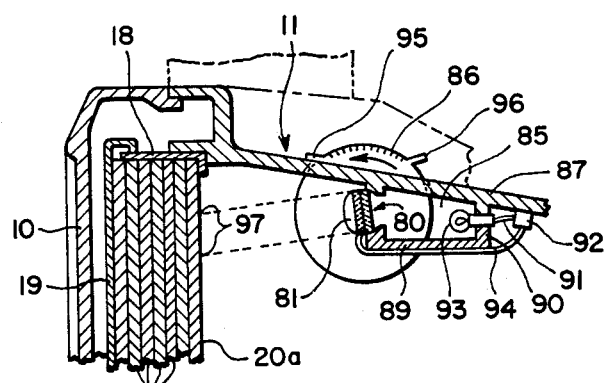

FIGS. 14-16 show an embodiment of the invention in which a single display with built in lens is rotated slightly to project the image of the display to various positions of the information area of the film.

Thus, liquid crystal display 80 with lens 81 built into the display immediately adjacent the front surface thereof is mounted for limited rotation on shaft 82 held in holes 83 in side walls 84 of light chamber 85. A thumb wheel 86 is secured to shaft 82 and extends from wall 87 of camera forward extension 11 as shown so that it can be rotated by a user. Light chamber 85 is formed by side walls 84, bottom wall 89 and rear wall 90 with the front of chamber 85 being configured as shown to substantially prevent escape of light about display 80. Wires 91 extend from terminal strip 92 to light source 93 located in chamber 85 and wires 94 extend to display 80.

Stops 95 and 96 are provided to stop rotation of thumb screw 86 and the display 80 in two positions. Other stop means such as detents in the thumb screw with spring loaded means engaging the detents could be used if more than two display positions are desired.

In user, the user would enter the information desired for the first line of the information area of the film and with the display in position, as shown in FIG. 15, illuminate light source 93 to thereby expose the information in the display onto the film portion 97. Thumb screw 86 is then rotated to the position shown in FIG. 14, the information to be displayed on the second line of information is entered into the display and light source 93 is illuminated to expose the information onto film portion 98. An advantage gained when using a lens with the display is that the size of the information characters in the display can be reduced so as to use less space on the film.

Figure 17:
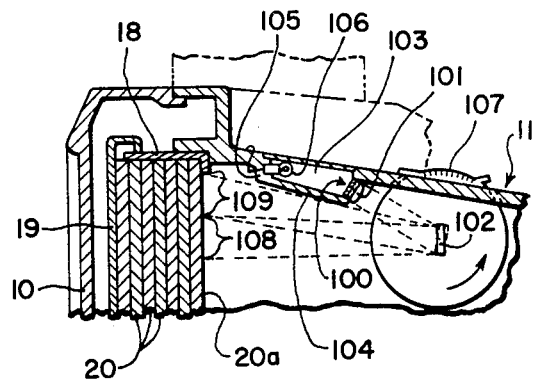

FIG. 17 shows an embodiment of the invention in which a single display is located in a stationary position within the camera and a mirror is used to project the image of the display to various positions in the information area of the film.

Thus, liquid crystal display 100 with built in lens 101 is located in camera forward extension 11 and is directed away from film 20a to be exposed but toward rotatable mirror 102. An illumination chamber 103 is formed by walls 104 and 105 and has light source 106 positioned thereon. Mirror 102 is rotatably mounted in front of display 100 so that it redirects the information focused on it by display 100 onto a portion of the information area of the film. The mirror along with thumb screw 107, is mounted for rotation similar to the display 80 in FIGS. 14–16. As shown in FIG. 17, the mirror can be alternately positioned to direct the displayed information onto portions 108 or 109 of film 20a.

Where movement of the display or other item, such as the mirror just described, is necessary, rather than manual movement as illustrated, movement could be made automatically by use of motors or solenoids. Springs could be used to move the display after the display is set to an initial position.

While various ways of carrying out the invention in actual practice have been shown and described, it should be realized that there are various other additional ways of carrying out the invention. For Example, multiple light sources could be located with respect to a display so that illumination of one source would cause the display to be projected at one angle while illumination of another light source would cause the display to be projected at a different angle, thereby exposing the information onto a different portion of the film, or, if multisection displays are used, all sections could be illuminated simultaneously and a mask used to block all but the desired section. The mask could then be moved so that another display section is uncovered to expose additional information on a different portion of the film.

If the normal liquid crystal display does not form a sufficiently opaque display background, an additional polarizing layer can be added to increase the opaqueness, or a light source in the high frequency range, such as a blue light, may be used since the normal polarizers are most effective in blocking such light. It may also be desirable in some instances to have a frosted front panel on the display so that the display acts as a screen for the information displayed and, if using lenses apart from the display itself, projects a more uniform image of the information onto the film.

While the invention has been shown and described in relation to a specific type of camera, it will be realized that the invention can easily be adapted to any type of camera. It must be remembered, however, that if the information is exposed on the back of the film rather than in front as described for the examples, the display should not be reversed. Such exposure from the back may be desirable for some type of cameras, such as 35 mm slide cameras.

When entering information onto the film, the information can be entered either just before the picture is taken or just after the picture is taken.

Since entering information into the camera is something which must be done manually at the time of taking the picture, in many instances it is preferred that, in addition to the information which can be entered via the keyboard, means be provided for automatically entering the data on one of the displays so that, unless overridden by the user as by filling the available information area before the picture is taken, the date will always appear as part of the information displayed. For this purpose, the usual calendar watch circuitry may be used as an information input. The display illumination means is then preferably coupled to the shutter in some manner so that the date information is automatically placed on the film when the picture is taken.

Rather than having the information area across the bottom of the photograph, as shows, the information area could be arranged in a number of ways and could even be set up in a format and used with preprinted or specially prepared film or similar photosensitive paper for the preparation of drivers licenses or other identification cards where the pertinent information would be entered via the keyboard and the identification picture taken.

It should also be realized that a method for placing information consisting of more than one set of a limited number of characters on film by utilizing a display and economical interface circuitry having only limited memory so that only a limited number of characters can be displayed at any one time has been disclosed. This method comprises the steps of entering one set of characters into a display and illuminating the display to expose or record the characters on the film, then entering an additional set of characters into the display and exposing them onto a different portion of the film. These steps may be repeated a number of times depending upon the number of positions on the film available for information recording. Also, it does not matter whether information is entered into the display and the display then moved or whether the display is moved and then new information entered.

Whereas this invention is here illustrated and described with specific reference to an embodiment thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. Apparatus for placing information on film comprising a multisection display means, each section thereof capable of displaying one set of a limited number of characters; means for the user to enter the limited number of characters making up a set of characters to be displayed; interface means for receiving a set of characters entered, storing such characters entered, and supplying signals to the display indicative of the characters entered; means for defining an information area on the film which can contain more than one set of characters; means for illuminating one section of the display so that one set of characters representing the information stored in the interface means is recorded in a portion of the information area of the film; and means for illuminating different sections of the display so that subsequently entered and displayed sets of characters are recorded in different portions of the information area of the film.

2. Apparatus for placing information on film according to claim 1, wherein each section has its own associated means of illumination.

3. Apparatus for placing information on film according to claim 2, wherein the displays are backlighted liquid crystal displays and such displays are individually illuminated by causing illumination of the associated illumination means.

4. Apparatus for placing information on film according to claim 1, wherein the displays are backlighted liquid crystal displays adapted to substantially block the flow of light therethrough if not operated, wherein a means of illumination is common to all displays, and wherein the displays are individually illuminated by both causing illumination of the common illumination means and operation of an individual display so that the informational characters of that display become substantially transparent to the flow of light.

5. Apparatus for placing information on film according to claim 1, wherein the means for the user to enter the set of characters to be displayed is a keyboard.

6. Apparatus for placing information on film according to claim 1, wherein the means for the user to enter the sets of characters to be displayed includes digital calendar circuitry associated therewith so that date information is automatically included as part of the information entered in one set of characters and displayed.

7. Apparatus for placing information on film according to claim 6, wherein the automatic entry of the date information can be overridden by the user.

8. A method of placing information consisting of more than one set of a limited number of characters on film using display means capable of displaying only a limited set of characters, comprising the steps of entering one limited set of characters to be placed on the film into the display means; illuminating the display means to expose that limited set of characters onto the film, moving the display means to a different portion of the film; entering an additional set of characters to be placed on the film into the display means; and illuminating the display means to expose the additional set of characters onto the film.

9. A method of placing information consisting of more than one set of a limited number of characters on film using display means capable of displaying at least two limited sets of characters at different physical locations, comprising the steps of entering one limited set of characters to be placed on the film into the display means; illuminating one set of characters as entered into the display means; entering a second limited set of characters to be placed on the film into the display means; and illuminating the second set of characters as entered into the display means at a different physical location in the display means.

10. Apparatus for placing information on film comprising display means capable of displaying one set of a limited number of characters; means for the user to enter the limited number of characters making up a set of characters to be displayed; interface means for receiving a set of characters entered, storing such characters entered, and supplying signals to the display indicative of the characters entered; means for defining an information area on the film which can contain more than one set of characters; means for illuminating the display so that one set of characters representing the information stored in the interface means is recorded in a portion of the information area of the film; and means for moving the display after a set of characters have been recorded in a portion of the information area of the film so that subsequent sets of characters may be entered and the display illuminated so that said subsequent sets of characters are recorded in different portions of the information area of the film.

11. Apparatus for placing information on film according to claim 10, wherein the means for moving the display moves the display from one position where the display is located immediately adjacent one portion of the information area of the film to be exposed to a second position immediately adjacent a second portion of the information area of the film to be exposed.

12. Apparatus for placing information on film according to claim 11, wherein the means for moving the display includes movement guides and the display is positioned for movement along such guides.

13. Apparatus for placing information on film according to claim 12, wherein the means for moving the display includes manual means for moving the display to positions along the guides.

14. Apparatus for placing information on film according to claim 13, wherein the manual means includes a wheel to be manually turned, gear means coupled to said wheel, and rack means attached to the display and mating with the gear means so that rotation of the wheel causes rotation of the gear means which causes movement of the rack means and display along the guides.

15. Apparatus for placing information on film according to claim 10, wherein the display includes means for projecting the information displayed onto a portion of the information area of the film and the means for moving the display moves the display from one position where the information displayed can be projected onto one portion of the information area of the film to a second position where the information displayed can be projected onto a second portion of the information area of the film.

16. Apparatus for placing information on film according to claim 15, wherein the display and the means for projecting the information displayed is adapted to rotate, thereby causing the information displayed to be projected on different portions of the information area of the film.

* * * * *